United States Patent
Xiao et al.

(10) Patent No.: US 10,985,363 B2
(45) Date of Patent: Apr. 20, 2021

(54) ELECTRODES AND METHODS OF FABRICATING ELECTRODES FOR ELECTROCHEMICAL CELLS BY CONTINUOUS LOCALIZED PYROLYSIS

(71) Applicant: GM GLOBAL TECHNOLOGY OPERATIONS LLC, Detroit, MI (US)

(72) Inventors: Xingcheng Xiao, Troy, MI (US); Hongliang Wang, Sterling Heights, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 16/239,040

(22) Filed: Jan. 3, 2019

(65) Prior Publication Data
US 2020/0220154 A1 Jul. 9, 2020

(51) Int. Cl.
*H01M 4/04* (2006.01)
*H01M 4/36* (2006.01)
(Continued)

(52) U.S. Cl.
CPC ....... *H01M 4/0471* (2013.01); *H01M 4/0404* (2013.01); *H01M 4/364* (2013.01);
(Continued)

(58) Field of Classification Search
CPC .................................................. H01M 4/0471
See application file for complete search history.

(56) References Cited

U.S. PATENT DOCUMENTS 3,551,057 A * 12/1970 Hamilton ................. G01D 5/26
356/400
8,440,350 B1 5/2013 Verbrugge et al.
(Continued)

FOREIGN PATENT DOCUMENTS

CN 111403691 A 7/2020
DE 102019135173 A1 7/2020

OTHER PUBLICATIONS

Smekens, Jelle et al., "Influence of Electrode Density on the Performance of Li-Ion Batteries: Experimental and Simulation Results," *Energies*, 2016, 9, 104 (Published Feb. 12, 2016); DOI: 10.3390/en9020104, 12 pages.

(Continued)

*Primary Examiner* — William D Young
(74) *Attorney, Agent, or Firm* — Harness, Dickey & Pierce, P.L.C.

(57) ABSTRACT

A method of manufacturing a silicon-carbon composite electrode assembly for an electrochemical cell includes forming an electrode by pyrolyzing at least a portion of a polymer in an assembly to form pyrolyzed carbon. The assembly includes an electrode precursor in electrical contact with a current collector. The electrode precursor includes a polymer and an electroactive material. The electroactive material includes silicon. The current collector includes an electrically-conductive material. The pyrolyzing includes directing an energy stream toward a surface of the electrode precursor. The surface is disposed opposite the current collector. The silicon-carbon composite electrode assembly includes the electrode and the current collector. In certain variations, the energy stream includes a laser beam or a plasma jet. In certain aspects, the electrode defines a concentration gradient between a first surface and a second surface.

20 Claims, 5 Drawing Sheets

(51) Int. Cl.
  *H01M 10/0525* (2010.01)
  *H01M 4/38* (2006.01)
  *H01M 4/587* (2010.01)
  *H01M 4/62* (2006.01)

(52) U.S. Cl.
  CPC ........... *H01M 4/386* (2013.01); *H01M 4/587* (2013.01); *H01M 4/625* (2013.01); *H01M 10/0525* (2013.01)

(56) References Cited

U.S. PATENT DOCUMENTS

| | | |
|---|---|---|
| 8,859,144 B2 | 10/2014 | Xiao |
| 8,999,584 B2 | 4/2015 | Jiang et al. |
| 9,005,811 B2 | 4/2015 | Xiao et al. |
| 9,093,830 B2 | 7/2015 | Krieg et al. |
| 9,142,830 B2 | 9/2015 | Xiao et al. |
| 9,178,208 B2 | 11/2015 | Park et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,397,338 B2 | 7/2016 | Park et al. |
| 9,531,004 B2 | 12/2016 | Xiao et al. |
| 9,553,303 B2 | 1/2017 | Park et al. |
| 9,564,639 B2 | 2/2017 | Huang |
| 9,570,752 B2 | 2/2017 | Huang et al. |
| 9,577,251 B2 | 2/2017 | Xiao et al. |
| 9,583,757 B2 | 2/2017 | Park et al. |
| 9,780,361 B2 | 10/2017 | Xiao et al. |
| 10,062,898 B2 | 8/2018 | Xiao |
| 2006/0074165 A1* | 4/2006 | Gelissen ............... B41M 5/267 524/430 |
| 2016/0036037 A1* | 2/2016 | Rhodes ............... H01M 4/625 429/211 |
| 2017/0040598 A1 | 2/2017 | Wang et al. |
| 2018/0083268 A1 | 3/2018 | Huang |
| 2018/0205114 A1 | 7/2018 | Pauric et al. |
| 2020/0020948 A1 | 1/2020 | Huang et al. |
| 2020/0020949 A1 | 1/2020 | Huang |
| 2020/0119339 A1 | 4/2020 | Halalay et al. |
| 2020/0127292 A1 | 4/2020 | Halalay et al. |

OTHER PUBLICATIONS

Halalay, Ion et al., U.S. Appl. No. 16/160,799, filed Oct. 15, 2018 entitled, "Method for Making Silicon-Containing Composite Electrodes for Lithium-Based Batteries," 47 pages.

\* cited by examiner

ELECTRODES AND METHODS OF FABRICATING ELECTRODES FOR ELECTROCHEMICAL CELLS BY CONTINUOUS LOCALIZED PYROLYSIS

INTRODUCTION

This section provides background information related to the present disclosure which is not necessarily prior art.

High-energy density electrochemical cells, such as lithium ion batteries can be used in a variety of consumer products and vehicles, such as Hybrid Electric Vehicles (HEVs) and Electric Vehicles (EVs). Typical lithium ion batteries include a first electrode (e.g., a positive electrode), a second electrode (e.g., a negative electrode), an electrolyte material, and a separator. Often a stack of lithium ion battery cells are electrically connected to increase overall output. Generally, lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from the positive electrode to a negative electrode during charging of the battery, and in the opposite direction when discharging the battery.

Contact of the electrode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the negative electrode and aluminum for the positive electrode). During battery usage, the current collectors associated with the two electrodes are connected by an external circuit that allows current generated by electrons to pass between the electrodes to compensate for transport of lithium ions.

SUMMARY

This section provides a general summary of the disclosure, and is not a comprehensive disclosure of its full scope or all of its features.

The present disclosure relates to electrodes and methods of fabricating electrodes for electrochemical cells using continuous localized pyrolysis.

In various aspects, the present disclosure provides a method of manufacturing a silicon-carbon composite electrode assembly for an electrochemical cell. The method includes forming an electrode by directing an energy stream toward at least one region of a surface of an electrode precursor including a polymer and an electroactive material to pyrolyze at least a portion of the polymer to form pyrolyzed carbon. The electroactive material includes silicon. During the directing, the electrode precursor is in electrical contact with a current collector including an electrically-conductive material and the directing is towards the surface of the electrode precursor opposite to the current collector. The method thus forms the silicon-carbon composite electrode assembly including the electrode and the current collector.

In one aspect, the pyrolyzing further includes translating at least one of the energy stream and the electrode precursor with respect to the other of the energy stream and the electrode precursor. The translating is performed concurrently with the directing. The translating facilitates thermally contacting the energy stream with substantially all of the polymer adjacent to the surface.

In one aspect, the energy stream includes a laser beam.

In one aspect, the laser beam is an ultraviolet (UV) laser beam having a wavelength of greater than or equal to about 150 nm to less than or equal to about 400 nm.

In one aspect, the laser beam is a carbon dioxide ($CO_2$) laser beam having a wave length of greater than or equal to about 9 μm to less than or equal to about 11 μm.

In one aspect, the directing further includes setting a focal plane of the laser beam at a distance from the surface. The distance is greater than or equal to about 0 mm to less than or equal to about 30 mm.

In one aspect, the laser beam is configured to intersect the surface over an area. The area has an aspect ratio of greater than or equal to about 1 to less than or equal to about 100.

In one aspect, the energy stream includes a plasma jet.

In one aspect, the directing employs a plasma source including one of atmosphere plasma, RF plasma, or electron-beam plasma.

In one aspect, the directing further includes operating a plasma source at a power of greater than or equal to about 50 W to less than or equal to about 5 kW. The directing further includes disposing a plasma nozzle at a distance from the surface. The distance is greater than or equal to about 0 mm to less than or equal to about 100 mm. The directing further includes employing a plasma deposition pressure of greater than or equal to about 1 mtorr to less than or equal to about 760 torr.

In one aspect, the method further includes forming an electrode precursor assembly. The forming the electrode precursor assembly includes forming a slurry by admixing a plurality of particles including the electroactive material, the polymer, and a solvent. The forming of the electrode precursor assembly further includes disposing the slurry on the current collector. The forming the electrode precursor assembly further includes forming an electrode precursor by drying the slurry to remove at least a portion of the solvent. The electrode precursor assembly includes the electrode precursor and the current collector.

In one aspect, the disposing the slurry on the current collector includes disposing the slurry in direct physical contact with the current collector.

In one aspect, the forming the slurry further includes admixing a conductive additive with the plurality of particles, the polymer, and the solvent. The conductive additive is selected from the group consisting of carbon black, graphite, chopped carbon fiber, milled carbon fiber, carbon nanotubes, carbon nanofibers, and combinations thereof.

In one aspect, the forming the electrode further includes doping the electrode precursor with a dopant selected from the group consisting of nitrogen, sulfur, phosphor, and combinations thereof. The doping is performed concurrently with the directing the energy stream.

In one aspect, the polymer is selected from the group consisting of polyimide, phenolic resin, polyamic acid, epoxy resin, polyvinylidene fluoride (PVDF), polyacrylonitrile (PAN), polydimethyl siloxane (PDMS), carboxymethyl cellulose (CMC), sodium-alginate, styrene butadiene rubber (SBR), and combinations thereof.

In various aspects, the present disclosure provides method of manufacturing a silicon-carbon composite electrode for an electrochemical cell. The method includes pyrolyzing at least a portion of a polymer in an electrode precursor. The electrode precursor includes a plurality of electroactive material particles and a polymer. The pyrolyzing includes directing an energy stream toward a surface of the electrode precursor. The energy stream includes a laser beam or a plasma jet. The pyrolyzing further includes translating at least one of the energy stream and the electrode precursor with respect to the other of the energy stream and the electrode precursor. The translating is performed concurrently with the directing to facilitate thermally contacting the energy stream with substantially all of the polymer adjacent to the surface.

In various aspects, the present disclosure provides a silicon-carbon composite electrode for an electrochemical cell. The silicon-carbon composite electrode includes a matrix and a plurality of electroactive material particles. The matrix includes pyrolyzed carbon and a polymer. The plurality of electroactive material particles are embedded in the matrix. The plurality of electroactive material particles include silicon. The silicon-carbon composite electrode extends between a first surface and a second surface. The first surface defines a first weight ratio of pyrolyzed carbon to polymer. The second surface defines a second weight ratio of pyrolyzed carbon to polymer. The first weight ratio is greater than the second weight ratio.

In one aspect, the second surface is configured to be directly electrically connected to a current collector.

In one aspect, the matrix defines a composition gradient between the first surface and the second surface. A pyrolyzed carbon weight percent decreases between the first surface and the second surface. A polymer weight percent increases between the first surface and the second surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A-4B are related to a method of pyrolyzing an electrode according to certain aspects of the present disclosure.

FIGS. 7-8 are laser beam shapes according to certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Many different materials may be used to create components for a lithium ion battery. By way of non-limiting example, positive electrode materials for lithium batteries typically include an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), and/or lithium iron phosphates. The electrolyte typically contains one or more lithium salts, which may be dissolved and ionized in a non-aqueous solvent. The negative electrode can include a lithium insertion material or an alloy host material.

Typical electroactive materials for forming a negative electrode include lithium-graphite intercalation compounds, lithium-silicon insertion compounds, lithium-tin insertion compounds, lithium alloys. While graphite compounds are most common, recently, negative electrode materials with high specific capacity (in comparison with conventional graphite) are of growing interest. For example, silicon has the highest known theoretical charge capacity for lithium, making it one of the most promising materials for rechargeable lithium ion batteries. However, current negative electrode materials including silicon suffer from significant drawbacks. The large volume changes (e.g., volume expansion/contraction) of silicon-containing materials during lithium insertion/extraction results in cracking of the negative electrode, a decline of electrochemical cyclic performance and diminished Coulombic charge capacity (capacity fade), and limited cycle life.

It would be desirable to develop high performance negative electrode materials including silicon for use in high power lithium ion batteries, which overcome the current shortcomings that prevent their widespread commercial use, especially in vehicle applications. For long term and effective use, negative electrode materials containing silicon should be capable of minimal capacity fade, fast charge capability, and maximized charge capacity for long-term use in lithium ion batteries.

Electrochemical Cells

Figure 1:
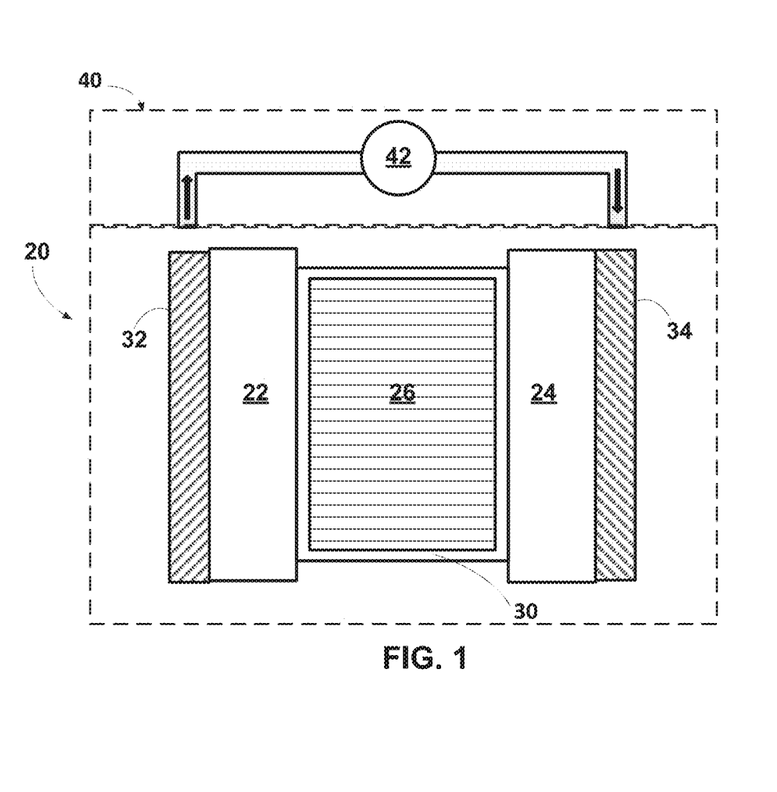
FIG. 1 is a schematic view of an electrochemical cell according to certain aspects of the present disclosure.

By way of background, an exemplary and schematic illustration of a battery 20 that cycles lithium ions is shown in FIG. 1. The battery 20 may be a lithium-ion electrochemical cell, a lithium-sulfur electrochemical cell, or a lithium-selenium battery. The battery 20 includes a negative electrode 22, a positive electrode 24, and a porous separator 26 disposed between the two electrodes 22, 24. The porous separator 26 includes an electrolyte system 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an interruptible external circuit 40. The external circuit 40 and a load device 42 connect the negative electrode 22 (through the negative electrode current collector 32) and the positive electrode 24 (through the positive electrode current collector 34).

The porous separator 26 operates as both an electrical insulator and a mechanical support, by being sandwiched between the negative electrode 22 and the positive electrode 24. The porous separator 26 prevents physical contact between the electrodes 22, 24, and thus, the occurrence of a short circuit. In addition to providing a physical barrier between the two electrodes, the porous separator 26 provides a minimal resistance path for internal passage of lithium ions (and related anions) during cycling of the lithium ions to facilitate functioning of the battery 20. In lithium-ion batteries, lithium intercalates and/or alloys in the electrode active materials. However, in a lithium-sulfur battery or a lithium-selenium battery, instead of intercalating or alloying, the lithium dissolves from the negative electrode and migrates to the positive electrode where it reacts/plates during discharge, while during charging, lithium plates on the negative electrode.

The battery 20 can generate electric current to the load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances. The load device 42 may also be a power-generating apparatus that charges the battery 20 for purposes of storing energy. In certain other variations, the electrochemical cell may be a supercapacitor, such as a lithium-ion based supercapacitor.

The battery 20 can be charged or re-energized at any time by connecting an external power source to the battery 20 to reverse the electrochemical reactions that occur during battery discharge. The connection of the external power source to the battery 20 compels the production of electrons and release of lithium ions from the positive electrode 24. The electrons, which flow back towards the negative electrode 22 through the external circuit 40, and the lithium ions, which are carried by the electrolyte system 30 across the porous separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, lithium-sulfur and lithium-selenium battery configurations, each of the negative electrode current collector 32, negative electrode 22, the porous separator 26, positive electrode 24, and positive electrode current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that, while not depicted here, are nonetheless known to those of skill in the art. For instance, the battery 20 may include a casing, gaskets, terminal caps, tabs, battery terminals, and any other components or materials that may be situated within the battery 20, including between or around the negative electrode 22, the positive electrode 24, and/or the porous separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Porous Separator

With renewed reference to FIG. 1, the porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the porous separator 26 are contemplated, as well as the many manufacturing methods that may be employed to produce such a microporous polymer separator 26.

Electrolyte

In various aspects, the positive electrode 24, the negative electrode 22, and the porous separator 26 may each include the electrolyte system 30, capable of conducting lithium ions between the negative electrode 22 and the positive electrode 24. The electrolyte system 30 may be a non-aqueous liquid electrolyte solution that includes one or more lithium salts dissolved in an organic solvent or a mixture of organic solvents. In certain variations, the electrolyte system 30 may be a 1M solution of one or more lithium salts in one or more organic solvents. Numerous conventional non-aqueous liquid electrolyte system 30 solutions may be employed in the battery 20.

A non-limiting list of lithium salts that may be dissolved in the one or more organic solvents to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate (LiB$(C_6H_5)_4$); lithium bis(oxalato)borate (LiB$(C_2O_4)_2$) (LiBOB); lithium difluorooxalatoborate (LiBF$_2(C_2O_4)$); lithium hexafluoroarsenate ($LiAsF_6$); lithium trifluoromethanesulfonate ($LiCF_3SO_3$); lithium trigluoromethanesulfonimide (LiN$(CF_3SO_2)_2$); lithium bis(fluorosulfonyl)imide (LiN$(FSO_2)_2$) (LiSFI); and combinations thereof.

These and other similar lithium salts may be dissolved in a variety of organic solvents, including but not limited to, various alkyl carbonates, such as cyclic carbonates (e.g., ethylene carbonate (EC), propylene carbonate (PC), butylene carbonate (BC), fluoroethylene carbonate (FEC)); linear carbonates (e.g., dimethyl carbonate (DMC), diethyl carbonate (DEC), ethylmethylcarbonate (EMC)); aliphatic carboxylic esters (e.g., methyl formate, methyl acetate, methyl propionate), γ-lactones (e.g., γ-butyrolactone, γ-valerolactone); chain structure ethers (e.g., 1,2-dimethoxyethane, 1-2-diethoxyethane, ethoxymethoxyethane); cyclic ethers (e.g., tetrahydrofuran, 2-methyltetrahydrofuran); and combinations thereof.

Positive Electrode

In various aspects, the positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase.

For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$(LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and x+y+z=1, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such as lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, the positive active materials may be intermingled with an optional electrically-conductive material and at least one polymeric binder material to structurally fortify the lithium-based active material along with an optional electrically-conductive particle distributed therein. For example, the active materials and optional conductive materials may be slurry cast with such binders, like polyvinylidene difluoride (PVDF), polytetrafluoroethylene (PTFE), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, and lithium alginate. Electrically-conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. As noted above, the positive electrode current collector 34 may be positioned at or near the positive electrode 24. The positive electrode current collector 34 may be formed from aluminum (Al) or any other appropriate electrically-conductive material known to those of skill in the art.

Negative Electrode

In various aspects, the negative electrode 22 includes an electroactive material as a lithium host material capable of functioning as a negative terminal of a lithium-ion battery. In certain aspects, the electroactive material of the negative electrode 22 includes a silicon negative electrode material. Thus, the negative electrode 22 may include the silicon negative electrode material as the electroactive lithium host material or optionally another electrically-conductive material, as well as one or more polymeric binder materials to structurally hold the lithium host material together. As noted above, negative electrode active materials including silicon have the highest known theoretical charge capacity for lithium, which makes them desirable for use in rechargeable lithium ion batteries. For example, silicon-based electrodes have been considered for high-performance applications (EVs/HEVs) due to their high specific capacity and energy density materials. However, in practice, certain negative electrode materials including silicon suffer from significant drawbacks. Such silicon-containing materials show large volume changes (e.g., volume expansion/contraction) during lithium insertion/extraction (e.g., intercalation and deintercalation) resulting in cracking of the negative electrode, a decline of electrochemical cyclic performance and diminished Coulombic charge capacity (capacity fade), and extremely limited cycle life. In particular, capacity fading for silicon-based negative electrodes has been challenging and a barrier to their widespread use in lithium ion batteries.

Notably, the present technology is particularly suitable for use with silicon-based negative electrode materials for lithium ion batteries. Thus, in accordance with certain aspects of the present disclosure, the negative electrode 22 is a material that includes silicon.

The negative electrode may be a composite electrode. Composite electrodes, and particularly composite electrodes including silicon and pyrolyzed carbon (e.g., hard carbon), advantageously have energy densities that are as good or better than typical lithium-ion batteries, high specific capacities, and are capable of fast charge (e.g., under 15 minutes). Some silicon-carbon composite electrodes are manufactured by combining a silicon electroactive material with a carbon binder on a current collector, and heating the electroactive material and binder together with the electroactive material, such as in a furnace. This single-step pyrolysis can cause mechanical degradation at an interface between the electrode and the current collector. The mechanical degradation, in combination with the large volume changes in silicon during cycling, can result in wrinkling and/or delamination at an interface between the electrode and current collector. As a result, under certain circumstances, a battery including the composite electrode and current collector after the pyrolysis may have a reduced life compared to other lithium ion batteries.

The silicon-carbon composite electrodes can alternatively be produced in a two-step process to reduce or eliminate damage at the interface. The two-step process includes forming a free-standing electrode, and then coupling the free-standing electrode to the current collector. The free-standing electrode may be formed by casting a slurry including the silicon and the binder on a conductive mesh, heating the slurry on the mesh to form the composite electrode, and then removing the mesh. The electrode may be coupled to the current collector, such as by applying a binder to one of the electrode and the current collector, and applying pressure at the interface. The two-step process is complex and time consuming. Furthermore, it requires significant handling of the delicate electrode, which could lead to damage of the composite electrode, resulting in quality problems.

In various aspects, the present disclosure provides a composite electrode that includes an electroactive material in a carbon phase, such as a plurality of electroactive material particles embedded in a matrix including carbon. The composite electrode may be a positive electrode or a negative electrode. In certain variations, the electroactive material includes silicon, the carbon phase includes pyrolyzed carbon. In certain aspects, the composite electrode is a negative electrode. In some variations, the composite electrode further includes a conductive additive. The present disclosure also provides a subassembly including the composite electrode and a current collector. The current collector is in electrical communication with the composite electrode. In certain variations, the composite electrode extends between a first surface and a second surface, the second surface being disposed adjacent to the current collector. The composite electrode may further include a polymer including carbon. The composite electrode may define a composition gradient between the first and second surfaces, for example, a polymer weight percent increasing between the first surface and the second surface, and a pyrolyzed carbon composition decreasing between the first surface and the second surface.

In various aspects, the present disclosure also provides methods of manufacturing a composite electrode including an electroactive material in a carbon phase. The method generally includes forming an electrode precursor by admixing a plurality of electroactive material particles and a polymer or a polymer precursor, including carbon. The method further includes forming an electrode assembly precursor by disposing the electrode precursor in electrical contact with a current collector. The method also includes forming an electrode by pyrolyzing at least a portion of the polymer in the electrode precursor to form a pyrolyzed carbon phase. Directing an energy stream toward a surface of the electrode precursor pyrolyzes the polymer. In certain variations, the pyrolyzing includes local pyrolysis via laser or plasma. In some variations, the method may further include in-situ doping of the electrode precursor with a dopant to modify ionic and/or electrical conductivity of the electrode. In some variations, the method may further include exposing the surface to a reducing gas to prevent oxidation of the electroactive material and/or the carbon.

The composite electrodes according to various aspects of the present disclosure may have several advantages compared to other types of electrodes, and composite electrodes manufactured by the one- and two-step processes described above. The local pyrolysis, such as via laser or plasma, facilitates better control of the pyrolysis through control of heating depth and absorption. Accordingly, the local pyrolysis can reduce or avoid thermal damage at the interface between the electrode and the current collector, reducing or eliminating undesirable delamination. The use of a laser or plasma can also facilitate creation of a composition gradient within the electrode between the first and second surfaces. More particularly, a pyrolyzed carbon content may be greater at the first surface than the second surface (adjacent to the current collector), and the unpyrolyzed polymer content may be greater at the second surface than the first surface. The polymer may advantageously be more flexible than the pyrolyzed carbon. The polymer may act as a binder so that the increased polymer content at the second surface further improves the strength of the interface to reduce or prevent delamination. The reduction in delamination can improve life of the electrode. Additionally, doping can be performed in situ, such as concurrently with the laser or plasma pyrolysis, to tailor conductivity of the pyrolyzed carbon. Furthermore, the localized pyrolysis can be integrated into a typical electrode fabrication process for large-scale production, as described below.

Methods of Manufacturing Composite Electrodes

In various aspects, the present disclosure provides a method of manufacturing a composite electrode and a composite electrode assembly for an electrochemical cell. The composite electrode assembly may be a silicon-carbon composite electrode assembly. The silicon-carbon composite electrode assembly includes a silicon-carbon composite electrode and a current collector. The method generally includes forming an electrode precursor assembly including an electrode precursor and a current collector, and forming the composite electrode via local pyrolysis by directing an energy stream toward the electrode precursor.

Figure 2:
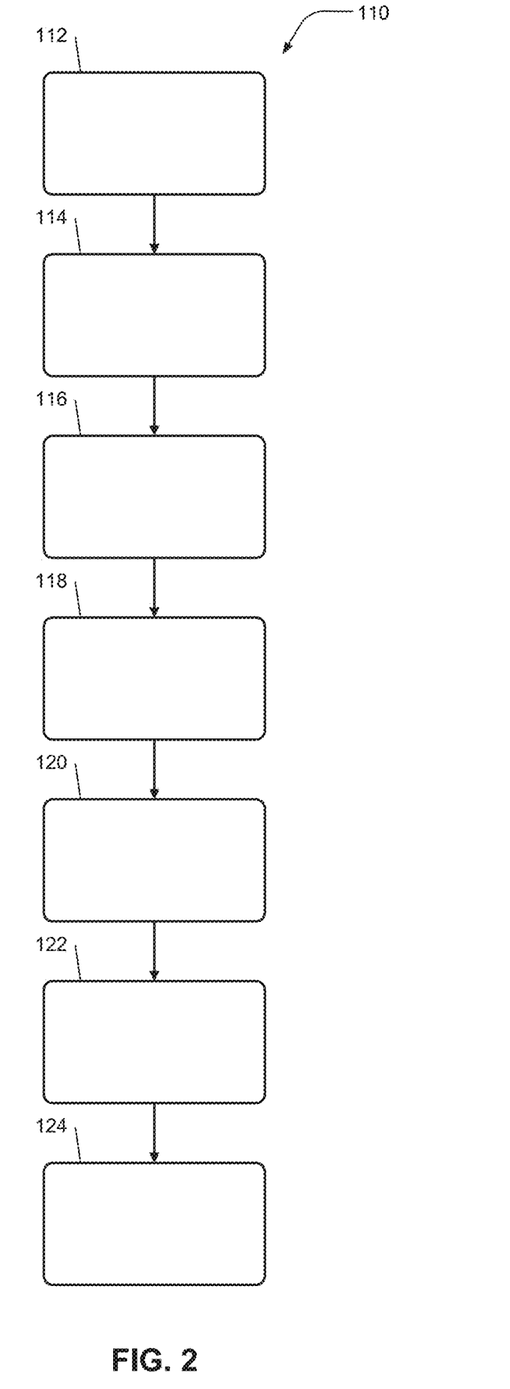
FIG. 2 is a flowchart depicting a method of fabricating an electrochemical cell according to certain aspects of the present disclosure.
Figure 3:
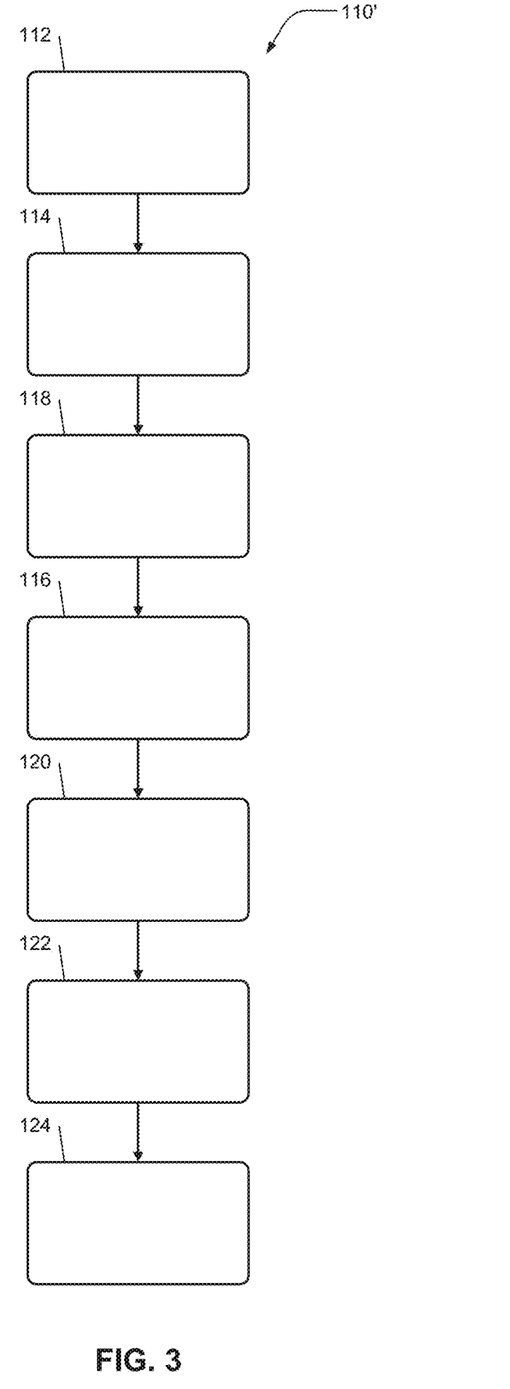
FIG. 3 is a flowchart depicting another method of fabricating an electrochemical cell according to certain aspects of the present disclosure.

As noted above, local pyrolysis can be integrated in to typical electrode forming processes. In various aspects, the present disclosure provides a method of fabricating an electrochemical cell. With reference to FIG. 2, a method 110 of fabricating an electrochemical cell according to various aspects of the present disclosure is provided. The method 110 generally includes forming an admixture 112, forming an electrode precursor assembly 114, performing local pyrolysis 116, calendaring 118, cutting electrodes 120, assembling cells 122, and forming and injecting electrolyte 124. With reference to FIG. 3, performing local pyrolysis 116 can alternatively be performed after calendaring 118 and prior to cutting electrodes 120. Each of the steps is described in turn below.

Forming the Admixture

In various aspects, the forming the admixture 112 may include admixing an electroactive material and a polymer precursor. The admixture may include the electroactive material at greater than or equal to about 5% by weight to less than or equal to about 95% by weight, optionally greater than or equal to about 20% by weight to less than or equal to about 90% by weight, or optionally greater than or equal to about 50% by weight to less than or equal to about 80% by weight. The admixture may include the polymer including carbon at greater than or equal to about 5% by weight to less than or equal to about 95% by weight, optionally greater than or equal to about 10% by weight to less than or equal to about 80% by weight, or optionally greater than or equal to about 20% by weight to less than or equal to about 50% by weight.

In certain aspects, the electroactive material may be in the form of a plurality of electroactive material particles. In certain variations, the electroactive material particles may be nanoparticles. The electroactive material particles may have an average diameter of greater than or equal to about 50 nm to less than or equal to about 50 µm (e.g., greater than or equal to about 50 nm to less than or equal to about 500 nm, or greater than or equal to about 500 nm to less than or equal to about 50 m), or optionally greater than or equal to about 500 nm to less than or equal to about 10 µm. The electroactive material may be capable of intercalating lithium. In certain aspects, the electroactive material may include silicon. Such a material may be silicon, lithium-silicon, silicon oxide ($SiO_x$), and/or silicon containing binary and ternary alloys. By way of example, binary and ternary alloys may include SiSn, SiSnFe, SiSnAl, SiFeCo, SiFeC, and the like. In certain variations, the electroactive material consists essentially of silicon (rather than alloys of silicon).

In certain variations, the electroactive material includes a particle or fiber having a coating of a material including silicon. In some variations, the particle or fiber includes carbon. Suitable carbon particles include carbon or graphite fibers, carbon nanofibers or nanotubes, carbon black, graphene, and/or graphite, by way of non-limiting example. In certain alternative variations, the particle or fiber may include aluminum oxide or titanium oxide, which is then coated with a material including silicon.

In other variations, non-silicon electroactive materials may be used alone, or in combination with silicon-containing electroactive materials. By way of example, other suitable electroactive materials include tin, aluminum, indium, or combinations thereof. The electroactive material may be a negative electroactive material for a negative electrode (e.g., negative electrode 22 of FIG. 1) or a positive electroactive material for a positive electrode (e.g., positive electrode 24 of FIG. 1).

The polymer or polymer precursor may include polyamic acid, polyimide, phenolic resins, epoxy resins, polyvinylidene fluoride (PVDF), polyacrylonitrile (PAN), polydimethyl siloxane (PDMS), carboxymethyl cellulose (CMC), sodium-alginate, styrene butadiene rubber (SBR), and the like, by way of example. In certain variations, the polymer or polymer precursor may be a binder, such as those described above.

The admixture may optionally further include a conductive additive. The admixture may include the conductive additive at greater than or equal to about 0.5% by weight to less than or equal to about 20% by weight (e.g., greater than or equal to about 0.5% by weight to less than or equal to about 5% by weight, or greater than or equal to about 5% by weight to less than or equal to about 20% by weight). The conductive additive may include graphite, chopped or milled carbon fiber, carbon nanofibers, carbon nanotubes, and/or other carbons, by way of example.

In certain variations, the admixture is a slurry including the electroactive material, the polymer or polymer precursor, and a solvent (e.g., an organic solvent). The polymer or polymer precursor may be dissolved in the solvent. The use of a solvent may facilitate better (e.g., more uniform or homogeneous) mixing of the polymer or polymer precursor and the electroactive material). The slurry may include the solvent at greater than or equal to about 1% by weight to less than or equal to about 50% by weight (e.g., greater than or equal to about 5% by weight to less than or equal to about 20% by weight, or greater than or equal to about 20% by weight to less than or equal to about 50% by weight). The solvent may include N-methyl-pyrollidone (NMP), acetone, diethyl ether, gamma butyrolactone, isopropanol, dimethyl carbonate, ethyl carbonate, dimethoxyethane, and the like.

Forming the Electrode Precursor Assembly

Forming the electrode precursor assembly 114 includes disposing the electrode precursor in electrical contact with a current collector. In certain variations, the forming the electrode precursor assembly 114 may include disposing the electrode precursor admixture on a surface of the current collector, such as by dry spraying, to forming the electrode precursor. In certain other variations, the forming the electrode precursor assembly 114 may include coating the electrode precursor slurry on a surface of the current collector, and then forming the electrode precursor by drying the slurry to remove at least a portion of the solvent. In certain aspects, forming the electrode precursor assembly may include polymerizing the polymer precursor.

Forming the Electrode Via Local Pyrolysis

Figure 4A:
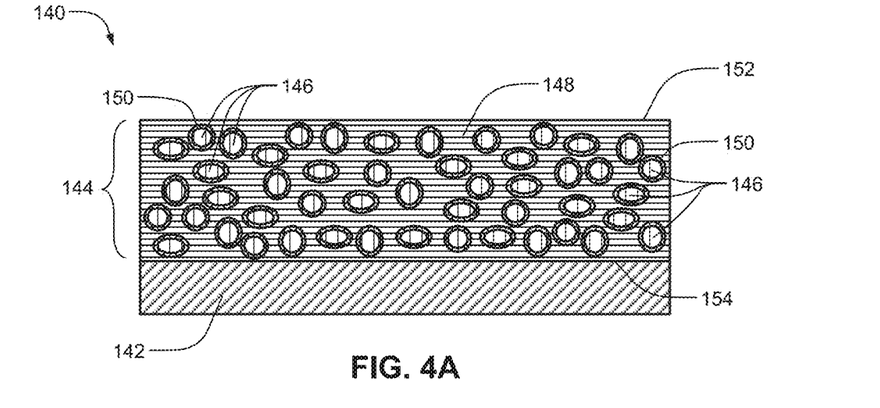
FIG. 4A shows an electrode precursor assembly prior to pyrolysis.

Local pyrolysis is performed at 116 to convert the electrode precursor to the electrode. With reference to FIG. 4A, an electrode precursor assembly 140 according to certain aspects of the present disclosure is provided. The electrode precursor assembly 140 includes a current collector 142 and an electrode precursor 144. The current collector 142 and the electrode precursor 144 are disposed in thermal contact with one another. In certain variations, the current collector 142 and the electrode precursor 144 are disposed in direct thermal contact with one another.

The electrode precursor 144 includes a plurality of electroactive material particles 146 and a matrix 148 including a polymer including carbon. In certain variations, the electroactive material particles 146 may be at least partially coated in an oxide layer 150. The oxide layer 150 may coat greater than or equal to about 10% of a surface area of each electroactive material particle 146, optionally greater than or equal to about 20%, optionally greater than or equal to about 30%, optionally greater than or equal to about 40%, optionally greater than or equal to about 50%, optionally greater than or equal to about 60%, optionally greater than or equal to about 70%, optionally greater than or equal to about 80%, optionally greater than or equal to about 90%, or optionally about 100%. In one example, the electroactive material particles 146 include silicon and the oxide layer 150 includes silicon dioxide ($SiO_2$).

The electroactive material particles 146 may be dispersed in the matrix 148. In certain variations, the electroactive material particles 146 may be substantially homogeneously dispersed in the matrix 148. In some variations, the electrode precursor 144 may further include a conductive additive (not shown) dispersed within the matrix 148. The electrode precursor 144 extends between a first surface 152 and a second surface 154 opposite the first surface 152. The second surface 154 is disposed adjacent to the current collector 142.

The performing local pyrolysis 116 (FIGS. 2-3) includes pyrolyzing at least a portion of the polymer to form pyrolyzed carbon. The pyrolyzed carbon may include partially-pyrolyzed carbon, soft carbon, hard carbon, graphitized carbon, or combinations thereof, depending on temperature. In general, higher pyrolysis temperatures may facilitate the increased formation $sp^2$-bonded carbon. In certain variations, the pyrolyzed carbon consists essentially of hard carbon. The pyrolyzing is performed by directing an energy stream (not shown) toward the first surface 152 of the electrode precursor 144. In certain variations, at least one of the energy stream and the electrode precursor assembly 140 may be translated with respect to the other of the energy stream and the electrode precursor assembly 140. The translating may be performed concurrently with the directing the energy stream. The translating may be performed until the energy stream has thermally contacted substantially the entire electrode precursor 144. The above process may be referred to a "continuous local pyrolysis."

Figure 4B:
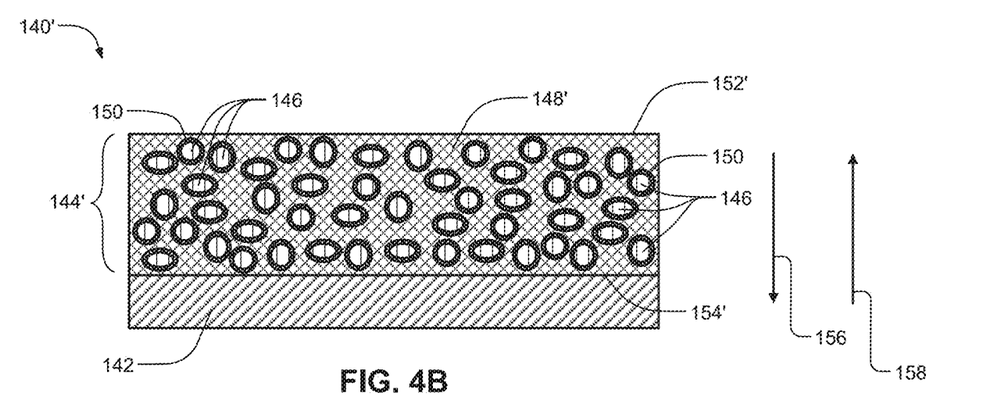
FIG. 4B shows an electrode assembly after pyrolysis.

With reference to FIG. 4B, an electrode assembly 140' according to certain aspects of the present disclosure is provided. The electrode assembly 140' includes the current collector 142 and an electrode 144'. The electrode 144' includes the plurality of electroactive material particles 146 having the oxide layer 150. The electrode 144' extends between a first surface 152' and an opposing second surface 154'. The second surface 154' is disposed adjacent to and in electrical contact with the current collector 142.

The electroactive material particles 146 are dispersed throughout a matrix 148' including pyrolyzed carbon. For example, the electroactive material particles 146 may be embedded within the matrix 148'. The matrix 148' may further include the polymer. In certain variations, the electroactive material particles 146 may be homogeneously distributed throughout the matrix 148'. In certain variations, the matrix 148' may be a substantially continuous phase defining pockets for the electroactive material particles 146. In various alternative variations, the carbon material (e.g., the pyrolyzed carbon and optionally polymer) may be in a form of discontinuous clusters including the pyrolyzed carbon (not shown).

In certain variations, the polymer of the matrix 148 (FIG. 4A) is substantially fully pyrolyzed so that the matrix 148' consists essentially of the pyrolyzed carbon. However, in some variations, the matrix 148 (FIG. 4A) is only partially pyrolyzed so that the matrix 148' includes the pyrolyzed carbon and the polymer. In certain variations, the matrix 148' may consist essentially of the pyrolyzed carbon and the polymer. By way of example, the matrix 148' may include greater than or equal to about 5% polymer by weight, optionally greater than or equal to about 10% polymer by weight, optionally greater than or equal to about 15% polymer by weight, optionally greater than or equal to about 20% polymer by weight, optionally greater than or equal to about 25% polymer by weight, optionally greater than or equal to about 30% polymer by weight, optionally greater than or equal to about 35% polymer by weight, optionally greater than or equal to about 40% polymer by weight, optionally greater than or equal to about 45% polymer by weight, or optionally greater than or equal to about 50% polymer by weight.

In certain variations, the electrode 144' may define a concentration gradient. The concentration gradient can be formed through controlled pyrolysis via laser beam or plasma jet, as described in greater detail below. In certain variations, the concentration gradient may extend between the first surface 152' and the second surface 154'. Thus, a polymer composition (e.g., polymer weight percent) may increase in a first direction 156 from the first surface 152' to the second surface 154'. A pyrolyzed carbon composition (e.g., pyrolyzed carbon compound weight percent) may increase in a second direction 158 opposite the first direction 156. In certain variations, the concentration gradient is linear between the first surface 152' and the second surface 154'. However, the gradient may also be non-linear, and can be controlled, at least in part, by magnitude of power of the laser beam or plasma jet, and conductivity of the electrode materials.

The first surface 152' may define a first weight ratio of pyrolyzed carbon to polymer. The second surface 154' may define a second weight ratio of pyrolyzed carbon to polymer. The first weight ratio may be greater than the second weight ratio. The increased concentration of the polymer at the second surface 154' compared to the first surface 152' may advantageously improve adhesion with the current collector 142 and yield a stronger interface between the electrode 144' and the current collector 142. Additionally, the polymer may be more flexible than the pyrolyzed carbon. The above characteristics made possible by the controlled local pyrolysis can reduce or prevent the occurrence of delamination during cycling of an electrochemical cell.

More particularly, at the first surface 152' of the electrode 144', the matrix 148' may have a first pyrolyzed carbon composition (e.g., a first pyrolyzed carbon weight percent) and a first polymer composition (e.g., a first polymer weight percent). At the second surface 154' of the electrode 144', the matrix 148' may have a second pyrolyzed carbon composition (e.g., a second pyrolyzed carbon weight percent) and a second polymer composition (e.g., a second polymer weight percent). The first pyrolyzed carbon composition may be greater than the second pyrolyzed carbon composition. The first polymer composition may be less than the second pyrolyzed carbon composition.

In various aspects, the first pyrolyzed carbon weight percent may greater than or equal to about 80% to less than or equal to about 100%, optionally greater than or equal to about 85% to less than or equal to about 100%, optionally greater than or equal to about 90% to less than or equal to about 100%, optionally greater than or equal to about 95% to less than or equal to about 100%, or optionally about 100%. In certain variations, the first polymer weight percent may be about 0%. However, in certain alternative variations, the first polymer weight percent may be greater than 0%, optionally greater than or equal to about 2%, optionally greater than or equal to about 5%, optionally greater than or equal to about 10%, optionally greater than or equal to about 15%, optionally greater than or equal to about 20%, or optionally greater than or equal to about 25%.

In various aspects, the second polymer weight percent may greater than or equal to about 20% to less than or equal to about 100%, optionally greater than or equal to about 50% to less than or equal to about 100%, optionally greater than or equal to about 60% to less than or equal to about 100%, optionally greater than or equal to about 70% to less than or equal to about 100%, optionally greater than or equal to about 80% to less than or equal to about 100%, optionally greater than or equal to about 85% to less than or equal to about 100%, optionally greater than or equal to about 90% to less than or equal to about 100%, optionally greater than or equal to about 95% to less than or equal to about 100%, or optionally about 100%. In certain variations, the second pyrolyzed carbon weight percent may be about 0%. However, in certain alternative variations, the second pyrolyzed carbon weight percent may be greater than 0% to less than or equal to about 80%, optionally greater than or equal to about 30% to less than or equal to about 70%, optionally greater than or equal to about 40% to less than or equal to about 60%, or optionally about 50%.

Figure 5:
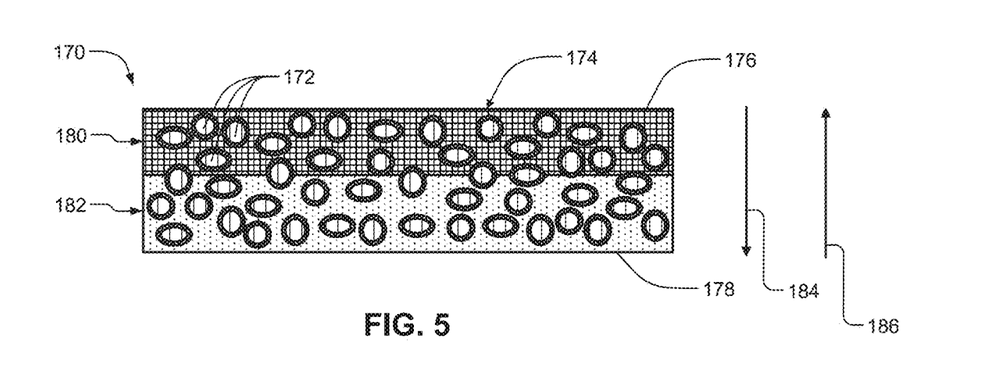
FIG. 5 is a schematic view of an electrode according to certain aspects of the present disclosure.

In certain variations, the electrode may include two or more layers. Referring to FIG. 5, an electrode 170 according to various aspects of the present disclosure is provided. The electrode 170 includes a plurality of electroactive material particles 172 and a matrix 174 including pyrolyzed carbon. The electrode 170 includes a first surface 176 and a second surface 178 disposed opposite the first surface 176. The second surface 178 is configured to be disposed adjacent to and in electrical communication with a current collector (not shown).

The matrix 174 includes a first portion 180 disposed adjacent to the first surface 176 and a second portion 182 disposed adjacent to the second surface 178. In one example, the first portion 180 consists essentially of pyrolyzed carbon and the second portion defines a concentration gradient. In the second portion, a polymer weight percent increases in a first direction 184 and a pyrolyzed carbon weight percent increases in a second direction 186 opposite the first direction. In another example, the first portion 180 defines a concentration gradient with a pyrolyzed carbon weight percent decreasing, and a polymer weight percent increasing, in the first direction 184. The second portion 182 consists essentially of polymer (unpyrolyzed). In yet another example, the first portion 180 consists essentially of pyrolyzed carbon and the second portion 182 consists essentially of polymer.

As noted above, the pyrolysis may be performed by an energy stream, such as a laser beam or plasma jet, which are described in turn below.

(a) Local Pyrolysis Via Laser

Figure 6:
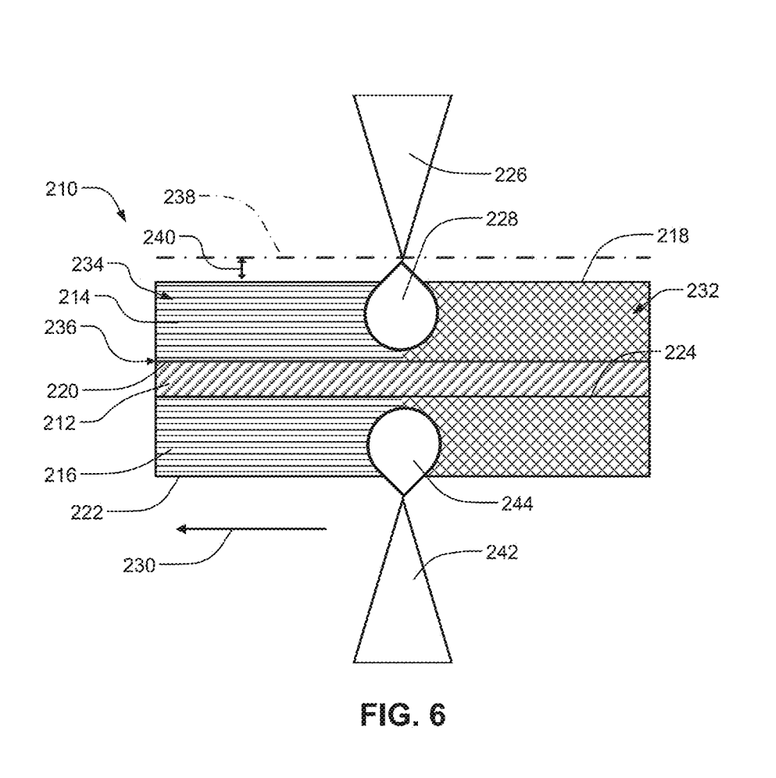
FIG. 6 is a schematic view of an electrode precursor assembly undergoing pyrolysis via laser beam according to certain aspects of the present disclosure.

With reference to FIG. 6, an electrode precursor assembly 210 according to various aspects of the present disclosure is provided. The electrode precursor assembly 210 includes a current collector 212, a first electrode 214, and a second electrode 216. The first electrode 214 includes a first surface 218 and a second surface 220 disposed opposite the first surface 218. The second surface 220 is disposed adjacent to and electrically connected to the current collector 212. The second electrode 216 includes a third surface 222 and a fourth surface 224 disposed opposite the third surface 222. The fourth surface 224 is disposed adjacent to and electrically connected to the current collector 212.

A polymer in a matrix of the first electrode 214 may be at least partially pyrolyzed by directing a first laser beam 226 toward the first surface 218. More particularly, the first laser beam 226 may be directed at a portion of the first surface 218 to create a first localized heating zone 228. At least one of the first electrode 214 and the first laser beam 226 may be moved (e.g., translated) with respect to the other of the first laser beam 226 and the first surface 218, such as in a first direction 230. A portion of a matrix in the first electrode 214 is locally pyrolyzed when it is in thermal contact with the first laser beam 226. Thus, as the first electrode 214 is undergoing pyrolysis, it may include a pyrolyzed portion 232 and an unpyrolyzed portion 234. The first electrode 214 may be continuously pyrolyzed by motion of the first laser beam 226 and or the first electrode 214.

The use of the first laser beam 226 for local pyrolysis permits greater control over pyrolysis than other methods, such as a furnace. Energy from the first laser beam 226 is absorbed by the first electrode 214 to heat and pyrolyze at least a portion of the polymer. Excess heat and energy that is not absorbed by the first electrode 214 may be absorbed by the current collector 212, and damage the current collector 212 or an interface 236 between the current collector and the first electrode 214. Operating parameters for the first laser beam 226 may be varied to control heat and energy absorption and resulting pyrolysis by the first electrode 214 and the current collector 212. In one example, operating parameters are adjusted to minimize energy absorption by the current collector 212. In another example, operating parameters are adjusted to maximize energy absorption by the first electrode 214 while minimizing energy absorption by the current collector 212. In yet another example, operating parameters are adjusted to create a concentration gradient in at least a portion of a matrix of the first electrode 214. In yet another example, operating parameters are adjusted so that a portion of the first electrode 214 adjacent to the current collector 212 (i.e., at the second surface 220) remains unpyrolyzed and the polymer of the matrix acts as a binder to couple the first electrode 214 to the current collector 212.

The first laser beam 226 may be an excimer laser, a diode pumped solid state (DPSS) laser, or a CO₂ laser, by way of example. Absorption of the first laser beam 226 by the polymer of the first electrode 214 is at least partially dependent upon frequency of the laser beam. Example wavelengths and frequencies for various lasers are shown in Table 1 below.

TABLE 1

| Property: | Excimer Laser | DPSS Laser | | | CO₂ Laser |
|---|---|---|---|---|---|
| Wavelength: | UV (e.g., 193 nm, 248 nm, 308 nm) | UV (e.g., 266 nm, 355 nm) | Visible (e.g, 532 nm) | IR (e.g, 1064 nm) | 10.6 μm |
| Polymer Absorption: | 60% | 50-60% | 10-20% | ~5% | 40-50% |

As shown in Table 1, UV lasers and CO₂ lasers generally yield the highest polymer absorption. In certain variations, the laser is an excimer laser operated at a UV wavelength, a DPSS laser operated at a UV wavelength, or a CO₂ laser. In some examples, the laser is a UV laser having a wavelength of greater than or equal to about 150 nm to less than or equal to about 400 nm (e.g., greater than or equal to about 150 nm to less than or equal to about 200 nm, greater than or equal to about 200 nm to less than or equal to about 250 nm, greater than or equal to about 250 nm to less than or equal to about 300 nm, greater than or equal to about 300 nm to less than or equal to about 350 nm, greater than or equal to about 350 nm to less than or equal to about 400 nm). In other examples, the laser is a CO₂ laser having a wavelength of greater than or equal to about 9 μm to less than or equal to about 11 μm (e.g., greater than or equal to about 9 μm to less than or equal to about 9.5 μm, greater than or equal to about 9.5 μm to less than or equal to about 10 μm, greater than or equal to about 10 μm to less than or equal to about 10.5 μm, greater than or equal to about 10.5 μm to less than or equal to about 11 μm).

In certain aspects, the laser may be absorbed by only a portion of the matrix of the first electrode 214 (e.g., a partial thickness adjacent to the first surface 218. Another portion of the matrix (e.g., the rest of the matrix) may be pyrolyzed via heat transfer. In certain variations, an additive, such as carbon black, may be added to the first electrode 214 to increase laser adsorption by the matrix. More particularly, the additive may be absorptive to all laser wavelengths, so that its addition to the matrix effectively makes laser absorption wavelength independent. Accordingly, the additive may facilitate adequate laser absorption with use of a typically lower-absorption laser, such as a DPSS laser operated with a visible or near-IR wavelength.

The electrode precursor assembly 210 includes the current collector 212 sandwiched between the first and second electrodes 214, 216. In certain variations, the polymer in the second electrode 216 may be pyrolyzed concurrently with the first electrode 214. Thus, a second laser beam 242 may be directed at the third surface 222 of the second electrode 216 to create a second localized heating zone 244. Motion of the second laser beam 242 may be linked to motion of the first laser beam 226. In some variations, the first and second laser beams 226, 242 may be first and second beam portions split from a single laser beam. Additionally, greater than two laser beams may be used to increase throughout. All of the characteristics of the first laser beam 226, described herein, may also apply to the second laser beam 242. In alternative aspects, the first and second electrodes 214, 216 may be pyrolyzed separately (i.e., at different times). In some variations, an electrode precursor assembly (e.g., the electrode precursor assembly 140 of FIG. 4A) includes a single current collector and electrode, and is therefore pyrolyzed by a single laser beam.

A focal plane 238 may be disposed at a distance 240 from the first surface 218. Thus, the first laser beam 226 may be defocused at the first surface 218. The distance 240 may be greater than or equal to about 0 mm, optionally greater than about 5 mm, optionally greater than or equal to about 10 mm, or optionally greater than or equal to about 20 mm. For example, the distance 240 may be greater than or equal to about 0 mm to less than or equal to about 30 mm, optionally greater than or equal to about 0 mm to less than or equal to about 20 mm, optionally greater than or equal to about 2.5 mm to less than or equal to about 15 mm, or optionally greater than or equal to about 5 mm to less than or equal to about 10 mm.

In various aspects, the first laser beam 226 is a continuous wave (CW) laser beam. The use of the CW laser beam may facilitate substantially uniform pyrolysis of the matrix of the first electrode 214. The first laser beam 226 may have a power of greater than or equal to about 5 W and less than or equal to about 500 W, optionally greater than or equal to about 20 W and less than or equal to about 200 W, or optionally greater than or equal to about 30 W and less than or equal to about 50 W. The first laser beam 226 may have a scan speed of greater than or equal to about 50 mm/s and less than or equal to about 5 m/s, optionally greater than or equal to about 200 mm/s and less than or equal to about 2 m/s, optionally greater than or equal to about 500 mm/s and less than or equal to about 1 m/s, or optionally about 1 m/s. In various alternative aspects, the first laser beam 226 may be a nanosecond pulsed laser beam. As described in greater detail below with respect to plasma jet polymerization, the laser beam pyrolysis may be performed concurrently with doping and or hydrocarbon treatment.

Power density of the first laser beam 226 is desirably uniform. In certain aspects, an enlarged laser beam, such as a laser beam having a high aspect ratio, may be used. Such laser beams define a flat-top heating distribution rather than a Gaussian heating distribution, resulting in the substantially uniform heating distribution. The enlarged laser beam may be capable of covering a large surface area to be pyrolyzed in a short amount of time, and may therefore be particularly suitable for mass production of electrodes. The enlarged laser beam may define an oblong shape, such as a rectangle, an oval, an ellipse, or a stadium, by way of example.

Figure 7:
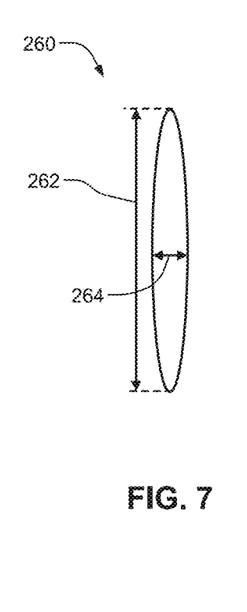
FIG. 7 is a substantially elliptical laser beam.

With reference to FIG. 7, a laser beam shape 260 according to various aspects of the present disclosure is provided. The shape 260 may be defined substantially parallel to the surface being heated by the laser (e.g., the first surface 218). The shape 260 may be substantially elliptical. The shape may define a height 262 and a width 264. The height 262 may be greater than the width 264. An aspect ratio may be defined by a ratio of the height 262 to the width 264. In certain variations, the aspect ratio may be greater than about 1, optionally greater than or equal to about 2, optionally greater than or equal to about 3, optionally greater than or equal to about 4, optionally greater than or equal to about 5, optionally greater than or equal to about 6, optionally greater than or equal to about 7, optionally greater than or equal to about 9, optionally greater than or equal to about 10, optionally greater than or equal to about 15, or optionally greater than or equal to about 20. In some examples, the aspect ratio is greater than or equal to about 1 to less than or equal to about 200 (e.g., greater than or equal to about 1 to less than or equal to about 100, greater than or equal to about 2 to less than or equal to about 100, greater than or equal to about 5 to less than or equal to about 100, greater than or equal to about 10 to less than or equal to about 100, greater than or equal to about 20 to less than or equal to about 100, or greater than or equal to about 50 to less than or equal to about 100).

Figure 8:
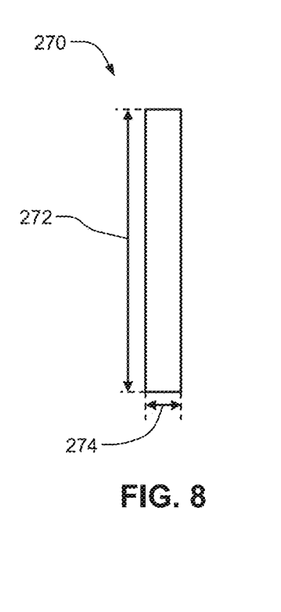
FIG. 8 is a substantially rectangular laser beam.

With reference to FIG. 8, another laser beam shape 270 according to various aspects of the present disclosure is provided. The shape 270 may be defined substantially parallel to the surface being heated by the laser (e.g., the first surface 218). The shape 270 may be substantially rectangular. The shape may define a height 272 and a width 274. The height 272 may be greater than the width 274. An aspect ratio may be defined by a ratio of the height 272 to the width 274. In certain variations, the aspect ratio may be greater than about 1, optionally greater than or equal to about 2, optionally greater than or equal to about 3, optionally greater than or equal to about 4, optionally greater than or equal to about 5, optionally greater than or equal to about 6, optionally greater than or equal to about 7, optionally greater than or equal to about 9, optionally greater than or equal to about 10, optionally greater than or equal to about 15, or optionally greater than or equal to about 20.

(b) Local Pyrolysis Via Plasma

Figure 9A:
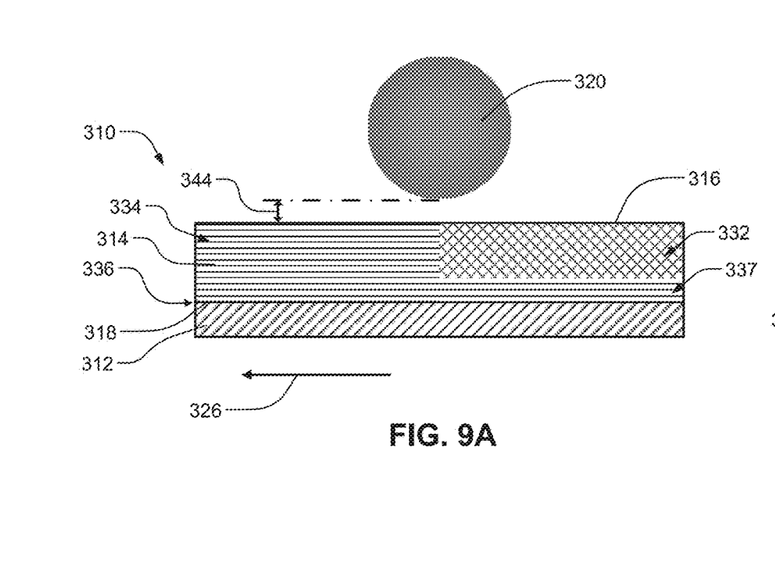
FIGS. 9A-9B are schematic views of an electrode undergoing pyrolysis via plasma jet according to certain aspects of the present disclosure.
Figure 9B:
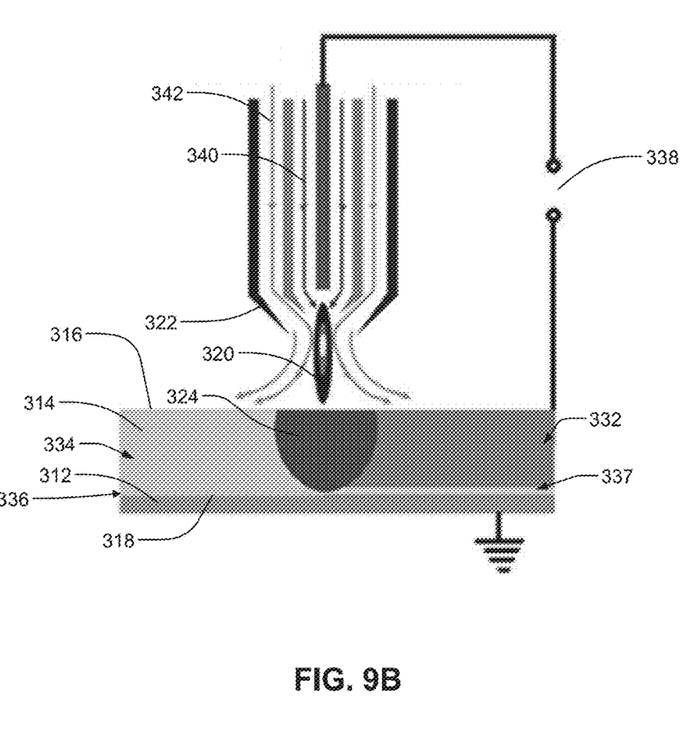

With reference to FIGS. 9A-9B, an electrode precursor assembly 310 according to various aspects of the present disclosure is provided. The electrode precursor assembly 310 includes a current collector 312 and an electrode 314. The electrode 314 includes a first surface 316 and a second surface 318 disposed opposite the first surface 316. The second surface 318 is disposed adjacent to and electrically connected to the current collector 312.

A polymer in the electrode 314 may be at least partially pyrolyzed by directing a plasma jet 320 toward the first surface 316. More particularly, the plasma jet 320 may be directed at a portion of the first surface 316 by a plasma nozzle 322 to create a localized heating zone 324 (FIG. 9B). At least one of the electrode 314 and the plasma nozzle 322 may be moved (e.g., translated) with respect to the other of the plasma jet 320 and the first surface 316, such as in a direction 326. A portion of a polymer in the electrode 314 is locally pyrolyzed when it is in thermal contact with the plasma jet 320. Thus, as the electrode 314 is undergoing pyrolysis, it may include a pyrolyzed portion 332 and an unpyrolyzed portion 334. The electrode 314 may be continuously pyrolyzed by motion of the plasma nozzle 322 and/or the electrode 314.

The use of the plasma jet 320 for local pyrolysis permits greater control over pyrolysis than other methods, such as a furnace. Energy from the plasma jet 320 is absorbed by the electrode 314 to pyrolyze at least a portion of the polymer. Excess energy that is not absorbed by the electrode 314 may be absorbed by the current collector 312 and damage the current collector 312 or an interface 336 between the current collector 312 and the electrode 314. Operating parameters for the plasma nozzle 322 may be varied to control energy absorption and resulting pyrolysis by the electrode 314 and the current collector 312. In one example, operating parameters are adjusted to minimize energy absorption by the current collector 312. In another example, operating parameters are adjusted to maximize energy absorption by the electrode 314 while minimizing energy absorption by the current collector 312. In yet another example, operating parameters are adjusted to create a concentration gradient in at least a portion of a matrix of the electrode 314. In yet another example, and as shown in FIGS. 9A-9B, operating parameters are adjusted so that a portion 337 of the electrode 314 adjacent to the current collector 312 (i.e., at the second surface 318) remains unpyrolyzed and the polymer of the matrix acts as a binder to couple the first electrode 314 to the current collector 312.

The plasma jet 320 may be generated by activating a plasma energy source (not shown). Any suitable plasma device may be used as the plasma energy source. In certain aspects, the plasma energy source may include atmosphere plasma, radio frequency plasma (RF), or electron-beam (e-beam) plasma. In certain variations, the plasma energy source may be contained in a plasma reaction chamber (not shown). However, in certain variations, the pyrolysis may be performed in open atmosphere. A plasma power source 338 may include direct current (DC), a radio frequency (RF), microwave, and alternating current (AC).

A reducing gas 340 can be introduced into the localized heating zone 324 to reduce an occurrence of or prevent oxidation of materials of the matrix and the electroactive material (e.g., carbon and silicon). The reducing gas 340 may include 3% hydrogen balance argon (Ar/3% $H_2$, by volume), methane ($CH_4$), nitrogen ($N_2$), ammonia ($NH_3$), and combinations thereof. Furthermore, a shield gas 342 may be introduce into the localized heating zone. The shield gas 342 may include argon (Ar), helium (He), nitrogen ($N_2$), or combinations thereof, by way of example.

Examples of the parameters of the plasma energy source that may be adjusted include a distance 344 between the plasma nozzle 322 and the first surface 316 of the electrode 314, deposition pressure, type of generator of the plasma, nozzle diameter, nozzle height, nozzle speed, flow rates, temperatures, plasma voltage, plasma current, plasma power, and/or plasma cycle time, by way of example. However, such parameters may not be pertinent in all plasma energy systems. In certain variations, temperature of the electrode 314 is controlled based on the distance 344, the power, and/or the deposition pressure.

In certain aspects, the distance 344 may be greater than or equal to about 0 mm to less than or equal to about 100 mm, optionally greater than about 0 mm to less than or equal to about 100 mm, optionally greater than or equal to about 20 mm to less than or equal to about 100 mm, optionally greater than or equal to about 40 mm to less than or equal to about 100 mm, optionally greater than or equal to about 60 mm to less than or equal to about 100 mm, or optionally greater than or equal to about 80 mm to 100 mm. In certain aspects, the power may be greater than or equal to about 50 W to less than or equal to about 5 kW (e.g., greater than or equal to about 50 W to less than or equal to about 500 W, or greater than or equal to about 500 W to less than or equal to about 5 kW). In certain aspects, the deposition pressure may be greater than or equal to about 1 mtorr to less than or equal to about 760 torr (e.g., greater than or equal to about 1 mtorr to less than or equal to about 10 mtorr, greater than or equal to about 10 mtorr to less than or equal to about 100 mtorr, greater than or equal to about 100 mtorr to less than or equal to about 1 torr, greater than or equal to about 1 torr to less than or equal to about 100 torr, greater than or equal to about 100 torr to less than or equal to about 200 torr, greater than or equal to about 200 torr to less than or equal to about 300 torr, greater than or equal to about 300 torr to less than or equal to about 400 torr, greater than or equal to about 400 torr to less than or equal to about 500 torr, greater than or equal to about 500 torr to less than or equal to about 600 torr, greater than or equal to about 600 torr to less than or equal to about 700 torr, or greater than or equal to about 700 torr to less than or equal to about 760 torr).

In certain aspects, a dopant (not shown) may be introduced into the localized heating zone 324 to tailor the ionic conductivity and electrical conductivity of the electrode 314. Ionic and electrical conductivity may be tailored to minimize internal resistance, thereby facilitating fast charge capability. In certain variations, a dopant may include nitrogen, sulfur, phosphor, or combinations thereof. The doping may be performed concurrently with the directing the plasma jet 320 at the first surface 316.

In certain variations, the electrode 314 is exposed to a hydrocarbon gas. The hydrocarbon gas may facilitate the formation of a layer including carbon on at least a portion of the electroactive material particles. The layer including carbon may increase electrical conductivity of the electrode 314. A flow of hydrocarbon gas may be controlled by a mass flow control meter. In certain aspects, the hydrocarbon gas may be carried into the chamber by an inert gas, such as argon.

In certain variations, an electrode precursor assembly may include a current collector sandwiched between two electrodes (see, e.g., electrode precursor assembly 210 of FIG. 6). Where the electrode precursor assembly includes two electrodes, two plasma jets may concurrently pyrolyze the respective electrodes. In certain aspects, motion of the first plasma jet may be linked to motion of a second plasma jet. In certain aspects, the plasma jets may be generated by the same plasma source.

Calendaring

Returning to FIGS. 2-3, at 118, calendaring may be performed on the electrode precursor assembly (FIG. 3), or the electrode assembly (FIG. 2). During calendaring, the electrode precursor or electrode is compressed to reduce a porosity of the electrode. For example, calendaring may include passing the electrode between a pair of rollers. The porosity may be greater than or equal to about 5% to less than or equal to about 60%, optionally greater than or equal to about 20% to less than or equal to about 50%, or optionally greater than or equal to about 30% to less than or equal to about 40%.

Cutting Electrodes

At 120, multiple electrode assemblies may be cut from a larger electrode assembly. For example, the electrodes may be cut or punched into strips of a desired shape. In certain variations, if only a single electrode assembly is formed, the cutting step may be omitted.

Assembling Cells

At 122, multiple electrode assemblies may be assembled together for use in an electrochemical cell. For example, the electrode assemblies may be wound or stacked together with one or more separators.

Forming and Injecting Electrolyte

Lastly, at 124, electrolyte is formed and filled into an electrochemical cell with the assembled cells. In the case of a liquid electrolyte, the electrolyte is injected so that it fully permeates and fills pores within the electrochemical cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a silicon-carbon composite electrode assembly for an electrochemical cell, the method comprising:

forming an electrode by directing an energy stream toward at least one region of a surface of an electrode precursor comprising a polymer and an electroactive material comprising silicon to pyrolyze at least a portion of the polymer to form pyrolyzed carbon, wherein during the directing, the electrode precursor is in electrical contact with a current collector comprising an electrically-conductive material and the directing is towards the surface of the electrode precursor opposite to the current collector, so as to form the silicon-carbon composite electrode assembly comprising the electrode and the current collector, wherein the directing creates a thermal gradient in the electrode precursor, the thermal gradient being configured to create a composition gradient in the electrode such that a carbonized carbon weight percent decreases between the surface and an interface between the electrode and the current collector, and a polymer weight percent increases between the surface and the interface.

2. The method of claim 1, wherein the directing further comprises translating at least one of the energy stream and the electrode precursor with respect to the other of the energy stream and the electrode precursor, the translating being performed concurrently with the directing, thereby thermally contacting the energy stream with substantially all of the polymer adjacent to the surface.

3. The method of claim 1, wherein the energy stream comprises a laser beam.

4. The method of claim 3, wherein the laser beam is an ultraviolet (UV) laser beam having a wavelength of greater than or equal to about 150 nm to less than or equal to about 400 nm.

5. The method of claim 3, wherein the laser beam is a carbon dioxide ($CO_2$) laser beam having a wavelength of greater than or equal to about 9 μm to less than or equal to about 11 μm.

6. The method of claim 3, wherein the directing further comprises setting a focal plane of the laser beam at a distance from the surface, the distance being greater than or equal to about 0 mm to less than or equal to about 30 mm.

7. The method of claim 3, wherein the laser beam is configured to intersect the surface over an area, the area having an aspect ratio of greater than or equal to about 1 to less than or equal to about 100.

8. The method of claim 1, wherein the energy stream comprises a plasma jet.

9. The method of claim 8, wherein the directing employs a plasma source selected from the group consisting of atmosphere plasma, RF plasma, electron-beam plasma, and combinations thereof.

10. The method of claim 8, wherein the directing further comprises:
operating a plasma source at a power of greater than or equal to about 50 W to less than or equal to about 5 kW;
disposing a plasma nozzle at a distance from the surface, the distance being greater than or equal to about 0 mm to less than or equal to about 100 mm; and
employing a plasma deposition pressure of greater than or equal to about 1 mtorr to less than or equal to about 760 torr.

11. The method of claim 1, further comprising forming an electrode precursor assembly prior to the directing, the forming the electrode precursor assembly comprising:
forming a slurry by admixing a plurality of particles comprising the electroactive material, the polymer, and a solvent;
disposing the slurry on the current collector; and
forming the electrode precursor by drying the slurry to remove at least a portion of the solvent, the electrode precursor assembly including the electrode precursor and the current collector.

12. The method of claim 11, wherein the disposing the slurry on the current collector comprises disposing the slurry in direct physical contact with the current collector.

13. The method of claim 11, wherein the forming the slurry further comprises admixing a conductive additive with the plurality of particles, the polymer, and the solvent, the conductive additive being selected from the group consisting of carbon black, graphite, chopped carbon fiber, milled carbon fiber, carbon nanotubes, carbon nanofibers, and combinations thereof.

14. The method of claim 1, wherein the forming the electrode further comprises doping the electrode precursor with a dopant selected from the group consisting of nitrogen, sulfur, phosphor, and combinations thereof, the doping being performed concurrently with the directing the energy stream.

15. The method of claim 1, wherein the polymer is selected from the group consisting of polyimide, phenolic resin, polyamic acid, epoxy resin, polyvinylidene fluoride (PVDF), polyacrylonitrile (PAN), polydimethyl siloxane (PDMS), carboxymethyl cellulose (CMC), sodium-alginate, styrene butadiene rubber (SBR), and combinations thereof.

16. A method of manufacturing a silicon-carbon composite electrode for an electrochemical cell, the method comprising:
forming the silicon-carbon composite electrode by pyrolyzing at least a portion of a polymer in an electrode precursor, the electrode precursor comprising a plurality of electroactive material particles and a polymer, the pyrolyzing comprising,
directing an energy stream toward a first surface of the electrode precursor, the energy stream comprising a laser beam or plasma, and
translating at least one of the energy stream and the electrode precursor with respect to the other of the energy stream and the electrode precursor, the translating being performed concurrently with the directing, thereby thermally contacting the energy stream with substantially all of the polymer adjacent to the first surface, wherein the directing creates a thermal gradient in the electrode precursor, the thermal gradient being configured to create a composition gradient in the electrode such that a carbonized carbon weight percent decreases between the first surface and a second surface opposite the first surface, and a polymer weight percent increases between the first surface and the second surface.

17. The method of claim 16, wherein the energy stream comprises a laser beam.

18. The method of claim 17, wherein the laser beam is an ultraviolet (UV) laser beam having a wavelength of greater than or equal to about 150 nm to less than or equal to about 400 nm.

19. The method of claim 17, wherein the laser beam is a carbon dioxide ($CO_2$) laser beam having a wavelength of greater than or equal to about 9 μm to less than or equal to about 11 μm.

20. The method of claim 17, wherein the laser beam is configured to intersect the first surface over an area, the area having an aspect ratio of greater than or equal to about 1 to less than or equal to about 100.

* * * * *